US009794120B2

(12) United States Patent
Chou et al.

(10) Patent No.: US 9,794,120 B2
(45) Date of Patent: Oct. 17, 2017

(54) MANAGING NETWORK CONFIGURATIONS IN A SERVER SYSTEM

(71) Applicant: Quanta Computer Inc., Taoyuan (TW)

(72) Inventors: Le-Sheng Chou, Taoyuan (TW); Sz-Chin Shih, Taoyuan (TW)

(73) Assignee: QUANTA COMPUTER, INC., Taoyuan (TW)

( * ) Notice: Subject to any disclaimer, the term of this patent is extended or adjusted under 35 U.S.C. 154(b) by 153 days.

(21) Appl. No.: 14/686,217

(22) Filed: Apr. 14, 2015

(65) Prior Publication Data

US 2016/0308717 A1     Oct. 20, 2016

(51) Int. Cl.
*H04L 12/24* (2006.01)
*G06F 13/38* (2006.01)
*G06F 13/12* (2006.01)

(52) U.S. Cl.
CPC ........ *H04L 41/0816* (2013.01); *G06F 13/385* (2013.01); *G06F 13/128* (2013.01)

(58) Field of Classification Search
None
See application file for complete search history.

(56) References Cited

U.S. PATENT DOCUMENTS

| 6,516,352 | B1 * | 2/2003 | Booth | H04L 12/403 370/463 |
| 7,149,817 | B2 * | 12/2006 | Pettey | H04L 29/06 709/200 |
| 7,149,819 | B2 * | 12/2006 | Pettey | H04L 29/06 709/200 |
| 8,031,731 | B2 * | 10/2011 | Yu | H04L 49/30 370/419 |
| 8,750,320 | B2 * | 6/2014 | Black | H04L 12/4625 370/403 |
| 8,767,756 | B2 * | 7/2014 | Black | H04L 12/4625 370/230 |
| 8,774,199 | B2 * | 7/2014 | Black | H04L 12/4625 370/389 |
| 8,798,091 | B2 * | 8/2014 | Black | H04L 49/357 370/461 |
| 2003/0014544 | A1 * | 1/2003 | Pettey | H04L 29/06 709/249 |
| 2004/0128398 | A1 * | 7/2004 | Pettey | H04L 29/06 709/249 |
| 2009/0304002 | A1 * | 12/2009 | Yu | H04L 49/30 370/395.3 |

* cited by examiner

*Primary Examiner* — Ranodhi Serrao
(74) *Attorney, Agent, or Firm* — Nixon Peabody LLP; Eduardo J. Quinones; Zhou Lu

(57) ABSTRACT

A controller in a server system can determine whether to share a network connection of the server system. In response to determining to share the network connection, the controller can disable a dedicated network connection between the controller and a network interface controller (NIC) in the server system, enable a first shared network connection between the controller and a computing module in the server system, and enable a second shared network connection between the computing module and the NIC. In response to determining not to share the network connection, the controller can enable the dedicated network connection between the controller and the NIC.

19 Claims, 6 Drawing Sheets

MANAGING NETWORK CONFIGURATIONS IN A SERVER SYSTEM

BACKGROUND

Field

This application relates to computer systems, and more particularly to a system and method for managing network configurations.

Background

Server systems are available in a vast array of hardware configurations to meet varying needs of data centers. Some server systems include a computing module such as a central processing unit (CPU) while some other systems, such as hard drive arrays, do not include a computing module. A server system may at times be powered off. Sometimes, the server systems may have a malfunctioning network interface controller (NIC) or network connection. However, a controller of the server system may still need a network connection to communicate with other server systems or the Internet.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for managing dedicated and/or shared network configurations.

In an aspect, a method is provided for managing network configurations in a server system. The method determines, by a controller of the server system, whether to share a network connection of the server system. In response to determining to share the network connection, the method disables a dedicated network connection between the controller and a network interface controller (MC) in the server system, enabling a first shared network connection between the controller and a computing module in the server system, and enabling a second shared network connection between the computing module and the NIC. In response to determining not to share the network connection, the method further enables the dedicated network connection between the controller and the NIC.

In another aspect, a server system includes a network interface controller (NIC) and a controller. The controller is configured to determine whether to share a network connection of the server system. In response to determining to share the network connection, the controller disables a dedicated network connection between the controller and a network interface controller (NIC) in the server system, enables a first shared network connection between the controller and a computing module in the server system, and enables a second shared network connection between the computing module and the NIC. In response to determining not to share the network connection, the controller enables the dedicated network connection between the controller and the NIC.

In yet another aspect, a non-transitory computer-readable medium storing executable instructions is provided for managing network configurations in a server system. The instructions, when executed by a data processing device, cause a data processing device to determine whether to share a network connection of the server system. In response to determining to share the network connection, the data processing device disables a dedicated network connection between the controller and a network interface controller (NIC) in the server system, enables a first shared network connection between the controller and a computing module in the server system, and enables a second shared network connection between the computing module and the NIC. In response to determining not to share the network connection, the data processing device enables the dedicated network connection between the controller and the NIC

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for managing network configurations in a server system, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

A server system (e.g., a rack server in a data center) often includes a controller, such as a baseboard management controller (BMC) or a rack management controller (RMC), to manage startup options (e.g., power on or off the server system). The subject disclosure provides a method in which a controller in a server system can further determine whether to share a network connection of the server system. In response to determining to share the network connection, the controller can disable a dedicated network connection and enabling a shared network connection. In response to determining not to share the network connection, the controller can enable the dedicated network connection.

Figure 1:
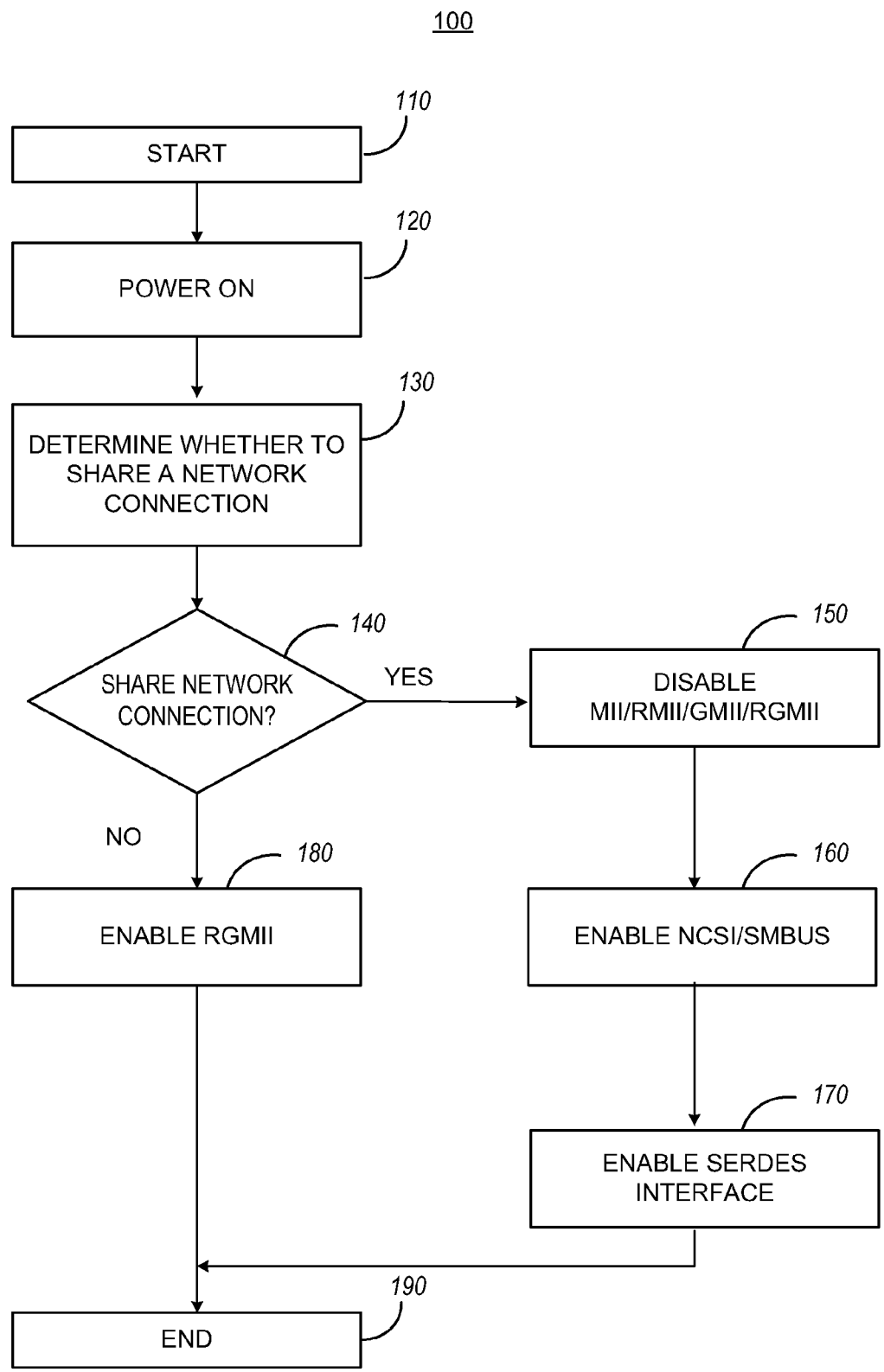
FIG. 1 illustrates a flow chart of an exemplary method for managing network configurations in a server system, according to certain aspects of the subject technology.

FIG. 1 illustrates a flow chart of an exemplary method for switching between dedicated and shared network configurations, according to certain aspects of the subject technology. The method begins at step 110. At step 120, the method powers on a server system. For example, the server system can include one or more computer servers that accept and respond to client requests. In another example, the server system can include a large number of hard disk drives (HDD) or other data storage devices.

At step 130, a controller, such as a BMC or RMC, can detect whether to share a network connection. For example, the network connection can be provided by a network interface controller (NIC). In a related aspect, the controller can detect whether the computing module is present. The computing module can be a network equipment such as a computer server that might require network access.

In another related aspect, the controller can detect whether the server system is powered down. If the server system is powered down, then the network connection may not need to be shared even if a computing module is present.

In yet another related aspect, the controller can detect whether a dedicated network connection between the controller and the NIC is disconnected or malfunctioning. If the dedicated network connection is disconnected or malfunctioning, the controller may need to rely on a shared network connection to obtain network access. At step 140, the method continues to step 150 if the controller determines to share the network connection.

At step 150, the controller can disable a dedicated network connection (e.g., Media Independent Interface (MII), Reduced Media Independent Interface (RMII), Gigabit Media Independent Interface (GMII), or Reduced Gigabit Media Independent Interface (RGMII)) between the controller and the NIC. In a related aspect, disabling the dedicated network connection can include changing a PHY chip hardware strapping. In a related aspect, to provide redundancy, the dedicated network connection is not disabled. For example, the dedicated network connection can be used to transfer debugging information.

At step 160, the controller can enable a first shared network connection (e.g., Network Controller Sideband Interface (NCSI) or a System Management Bus (SMBus)) between the controller and the computing module.

At step 170, the controller can also enable the second shared network connection (e.g., Serializer/Deserializer (SERDES) interface) between the computing module to the NIC. In a related aspect, enabling the second shared network connection can include changing a PHY chip hardware strapping to enable the SERDES interface. From step 170, the method ends at step 190. In another related aspect, the controller can detect whether there is a malfunction in the SERDES interface. In response to detecting a malfunction in the SERDES interface, the controller can enable the dedicated network connection.

At step 140, the method continues to step 180 if the controller determines not to share the network connection. At step 180, the controller can also enable a dedicated network connection (e.g., Media Independent Interface (MII), Reduced Media Independent Interface (RMII), Gigabit Media Independent Interface (GMII), or Reduced Gigabit Media Independent Interface (RGMII)) between the controller and the NIC. In a related aspect, enabling the dedicated network connection can include changing a PHY chip hardware strapping. From step 180, the method ends at step 190.

Figure 2:
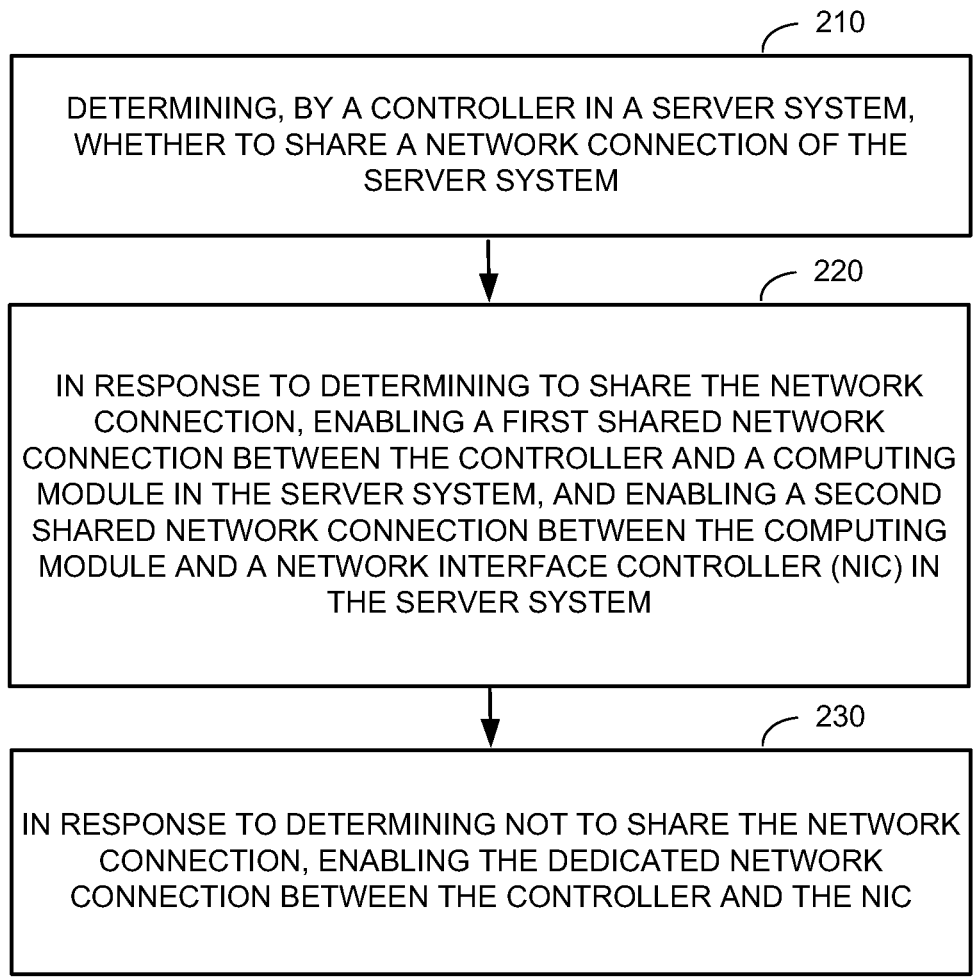
FIG. 2 illustrates an example methodology for managing network configurations in a server system.

FIG. 2 illustrates an example methodology for switching between dedicated and shared network configurations.

In accordance with one or more aspects of the implementations described herein, with reference to FIG. 2, a methodology 200 is shown for managing network configurations in a server system. The method 200 can involve, at step 210, determining, by a controller in a server system, whether to share a network connection of the server system. In a related aspect, determining whether to share a network connection of the server system comprises detecting whether the computing module is present. In another related aspect, determining whether to share a network connection of the server system is at least in part based on whether the server system is powered down. In yet another related aspect, determining whether to share a network connection of the server system is at least in part based on whether the dedicated network connection between the controller and the NIC is disconnected or malfunctioning.

The method 200 can involve, at step 220, in response to determining to share the network connection, enabling a first shared network connection between the controller and a computing module in the server system, and enabling a second shared network connection between the computing module and a network interface controller (NIC) in the server system. In a related aspect, the method 200 can further involve disabling the dedicated network connection between the controller and the NIC in the server system, in response to determining to share the network connection. In another related aspect, the method 200 can further involve enabling the dedicated network connection between the controller and the NIC in the server system, in response to determining to share the network connection. In a related aspect, the method 200 can further involve detecting for a malfunction in the second shared network connection and in response to detecting the malfunction in the second shared network connection, enabling the dedicated network connection. In a related aspect, the second shared network connection comprises a Serializer/Deserializer (SERDES) interface. In another related aspect, enabling the second shared network connection includes changing a PHY chip hardware strapping to enable the SERDES interface.

The method 200 can involve, at step 230, in response to determining not to share the network connection, enabling the dedicated network connection between the controller and the NIC. In a related aspect, the dedicated network connection includes a Media Independent Interface (MII) or a Reduced Gigabit Media Independent Interface (RGMII) between the controller and the NIC. In another related aspect, enabling or disabling the dedicated network connection includes changing a PHY chip hardware strapping to enable or disable the MII or RGMII.

Figure 3:
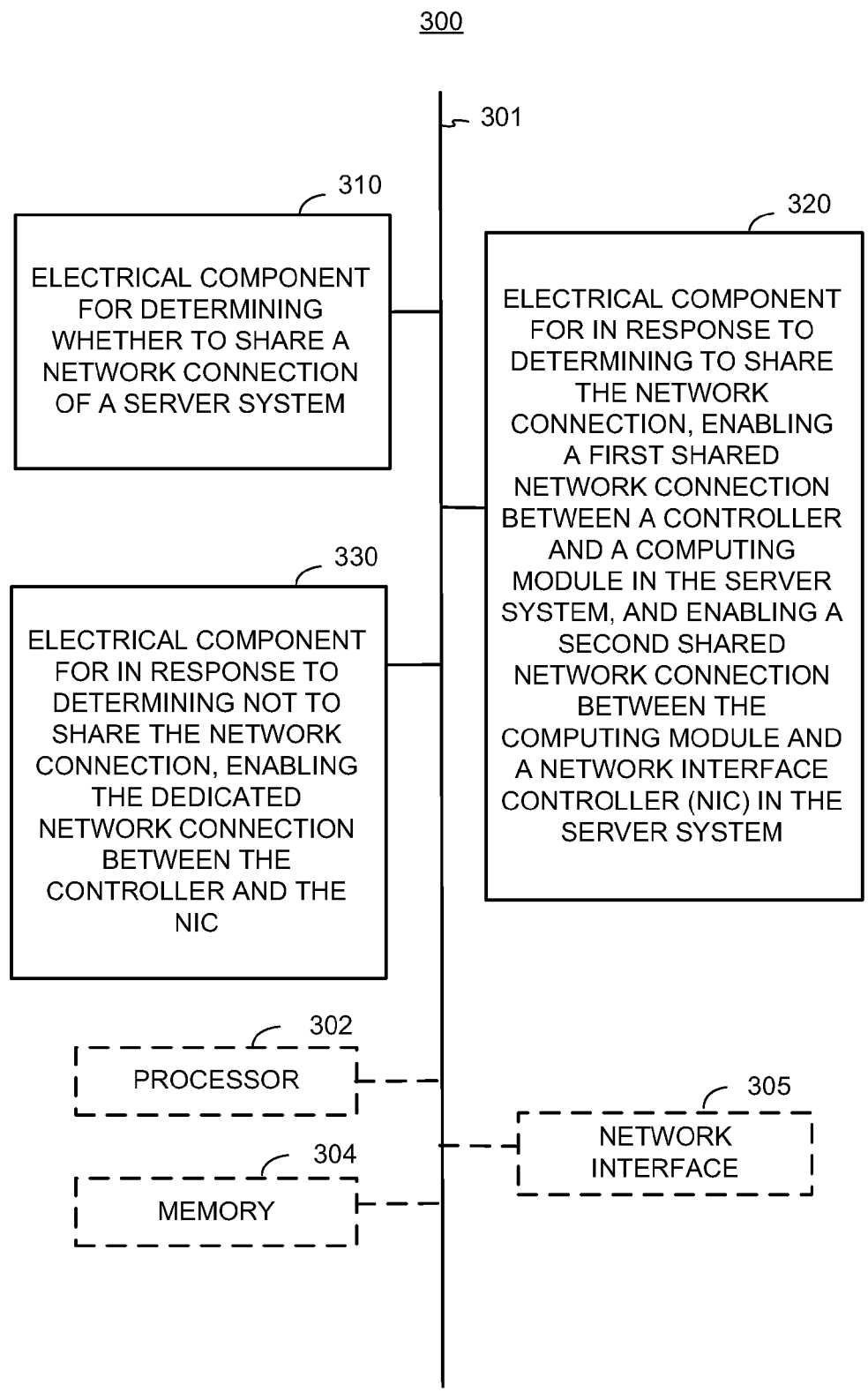
FIG. 3 illustrates a block diagram of an example apparatus for managing network configurations in a server system, in accordance with the methodology of FIG. 2.

In accordance with one or more aspects of the implementations described herein, FIG. 3 illustrates an exemplary apparatus for switching between dedicated and shared network configurations, in accordance with the methodology of FIG. 3. The exemplary apparatus 300 can be configured as a computing device, a processor, or similar device/component for use within. In one example, the apparatus 300 can include functional blocks that can represent functions implemented by a processor, software, or combination thereof (e.g., firmware). In another example, the apparatus 300 can be a system on a chip (SoC) or similar integrated circuit (IC).

In one implementation, the apparatus 300 can include an electrical component or module 310 for determining whether to share a network connection of a server system.

The apparatus 300 can include an electrical component 320 for in response to determining to share the network connection, enabling a first shared network connection between a controller and a computing module in the server system, and enabling a second shared network connection between the computing module and a network interface controller (NIC) in the server system.

The apparatus 300 can include an electrical component 330 for in response to determining not to share the network connection, enabling the dedicated network connection between the controller and the NIC.

It should be understood that functions performed by the electrical components 310-330 can be performed by either more or fewer electrical components than shown. In further related aspects, the apparatus 300 can optionally include a processor component 302. The processor 302 can be in operative communication with the components 310-330 via a bus 301 or similar communication coupling. The processor 302 can effect initiation and scheduling of the processes or functions performed by electrical components 310-330.

The apparatus 300 can also include a network interface 305 for connecting to one or more other communication devices or the like. The apparatus 300 can optionally include a component for storing information, such as, for example, a memory device/component 304. The computer readable medium or the memory component 304 can be operatively coupled to the other components of the apparatus 300 via the bus 301 or the like. The memory component 304 can be adopted to store computer readable instructions and data for affecting the processes and behavior of the components 310-330, and subcomponents thereof, or the processor 302, or the methods disclosed herein. The memory component 304 can retain instructions for executing functions associated with the components 310-330. While shown as being external to the memory 304, it is to be understood that the components 310-330 can exist within the memory 304. It is further noted that the components in FIG. 3 can include processors, electronic devices, hardware devices, electronic sub-components, logical circuits, memories, software codes, firmware codes, etc., or any combination thereof.

Persons skilled in the art will appreciate that the functionalities of each component of the apparatus 300 can be implemented in any suitable component of the system or combined in any suitable manner.

Figure 4:
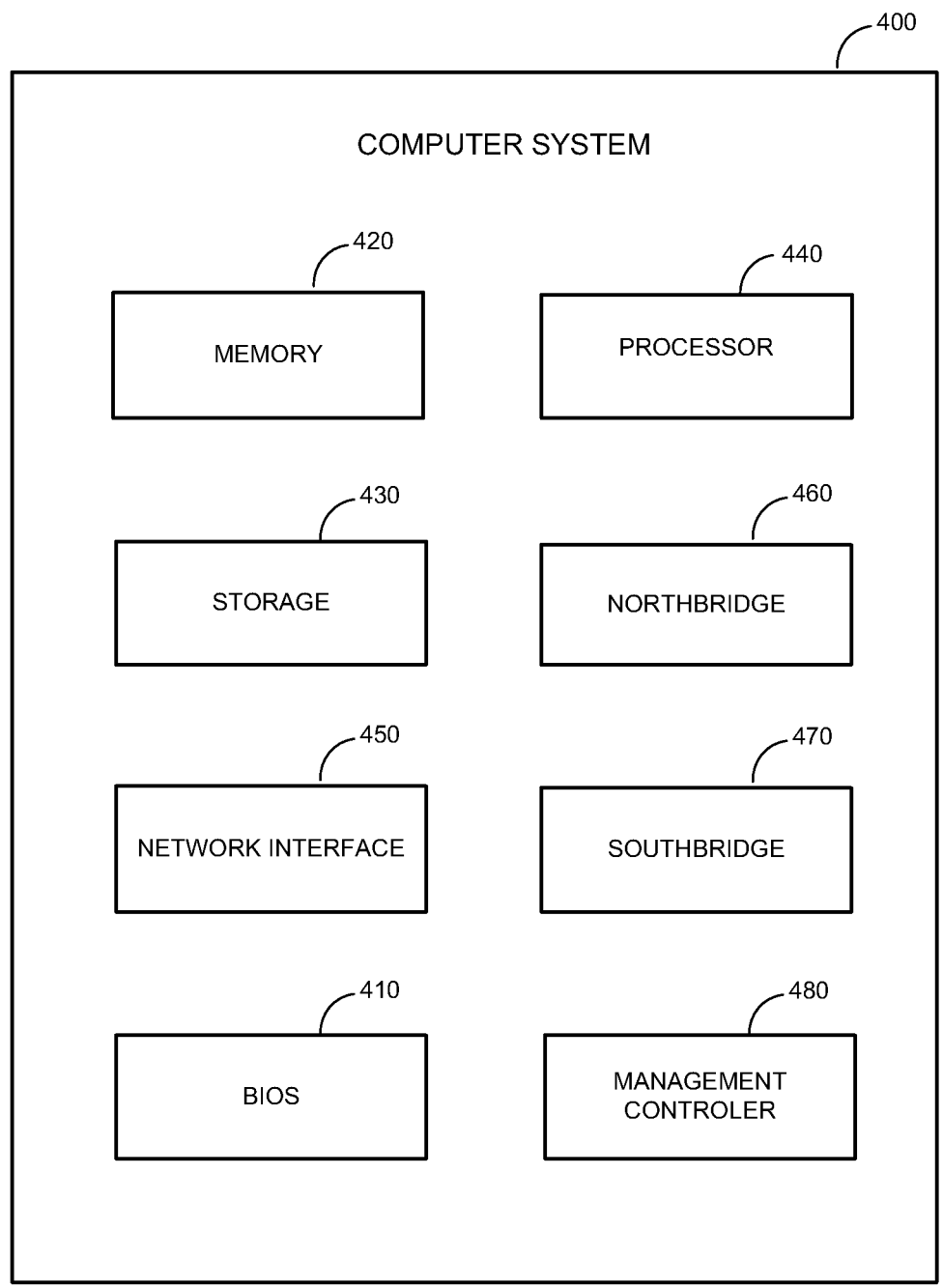
FIG. 4 illustrates a block diagram of an example computer system.

FIG. 4 illustrates a block diagram of an example computer system 400. The computer system 400 can include a processor 440, a network interface 450, a management controller 480, a memory 420, a storage 430, a Basic Input/Output System (BIOS) 410, and a northbridge 460, and a southbridge 470.

The computer system 400 can be, for example, a server (e.g., one of many rack servers in a data center) or a personal computer. The processor (e.g., central processing unit (CPU)) 440 can be a chip on a motherboard that can retrieve and execute programming instructions stored in the memory 420. The processor 440 can be a single CPU with a single processing core, a single CPU with multiple processing cores, or multiple CPUs. One or more buses (not shown) can transmit instructions and application data between various computer components such as the processor 440, memory 420, storage 430, and networking interface 450.

The memory 420 can include any physical device used to temporarily or permanently store data or programs, such as various forms of random-access memory (RAM). The storage 430 can include any physical device for non-volatile data storage such as a HDD or a flash drive. The storage 430 can have a greater capacity than the memory 420 and can be more economical per unit of storage, but can also have slower transfer rates.

The BIOS 410 can include a Basic Input/Output System or its successors or equivalents, such as an Extensible Firmware Interface (EFI) or Unified Extensible Firmware Interface (UEFI). The BIOS 410 can include a BIOS chip located on a motherboard of the computer system 400 storing a BIOS software program. The BIOS 410 can store firmware executed when the computer system is first powered on along with a set of configurations specified for the BIOS 410. The BIOS firmware and BIOS configurations can be stored in a non-volatile memory (e.g., NVRAM) 412 or a ROM such as flash memory. Flash memory is a non-volatile computer storage medium that can be electronically erased and reprogrammed.

The BIOS 410 can be loaded and executed as a sequence program each time the computer system 400 is started. The BIOS 410 can recognize, initialize, and test hardware present in a given computing system based on the set of configurations. The BIOS 410 can perform self-test, such as a Power-on-Self-Test (POST), on the computer system 400. This self-test can test functionality of various hardware components such as hard disk drives, optical reading devices, cooling devices, memory modules, expansion cards and the like. The BIOS can address and allocate an area in the memory 420 in to store an operating system. The BIOS 410 can then give control of the computer system to the OS.

The BIOS 410 of the computer system 400 can include a BIOS configuration that defines how the BIOS 410 controls various hardware components in the computer system 400. The BIOS configuration can determine the order in which the various hardware components in the computer system 400 are started. The BIOS 410 can provide an interface (e.g., BIOS setup utility) that allows a variety of different parameters to be set, which can be different from parameters in a BIOS default configuration. For example, a user (e.g., an administrator) can use the BIOS 410 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 480 can be a specialized microcontroller embedded on the motherboard of the computer system. For example, the management controller 480 can be a BMC or a RMC. The management controller 480 can manage the interface between system management software and platform hardware. Different types of sensors built into the computer system can report to the management controller 480 on parameters such as temperature, cooling fan speeds, power status, operating system status, etc. The management controller 480 can monitor the sensors and have the ability to send alerts to an administrator via the network interface 450 if any of the parameters do not stay within preset limits, indicating a potential failure of the system. The administrator can also remotely communicate with the management controller 480 to take some corrective action such as resetting or power cycling the system to restore functionality.

The northbridge 460 can be a chip on the motherboard that can be directly connected to the processor 440 or can be integrated into the processor 440. In some instances, the northbridge 460 and the southbridge 470 can be combined into a single die. The northbridge 460 and the southbridge 470, manage communications between the processor 440 and other parts of the motherboard. The northbridge 460 can manage tasks that require higher performance than the southbridge 470. The northbridge 460 can manage communications between the processor 440, the memory 420, and video controllers (not shown). In some instances, the northbridge 460 can include a video controller.

The southbridge 470 can be a chip on the motherboard connected to the northbridge 460, but unlike the northbridge 460, is not directly connected to the processor 440. The southbridge 470 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the computer system 400. The southbridge 470 can be connected to or can include within the southbridge 470 the management controller 470, Direct Memory Access (DMAs) controllers, Programmable Interrupt Controllers (PICs), and a real-time clock.

Figure 5:
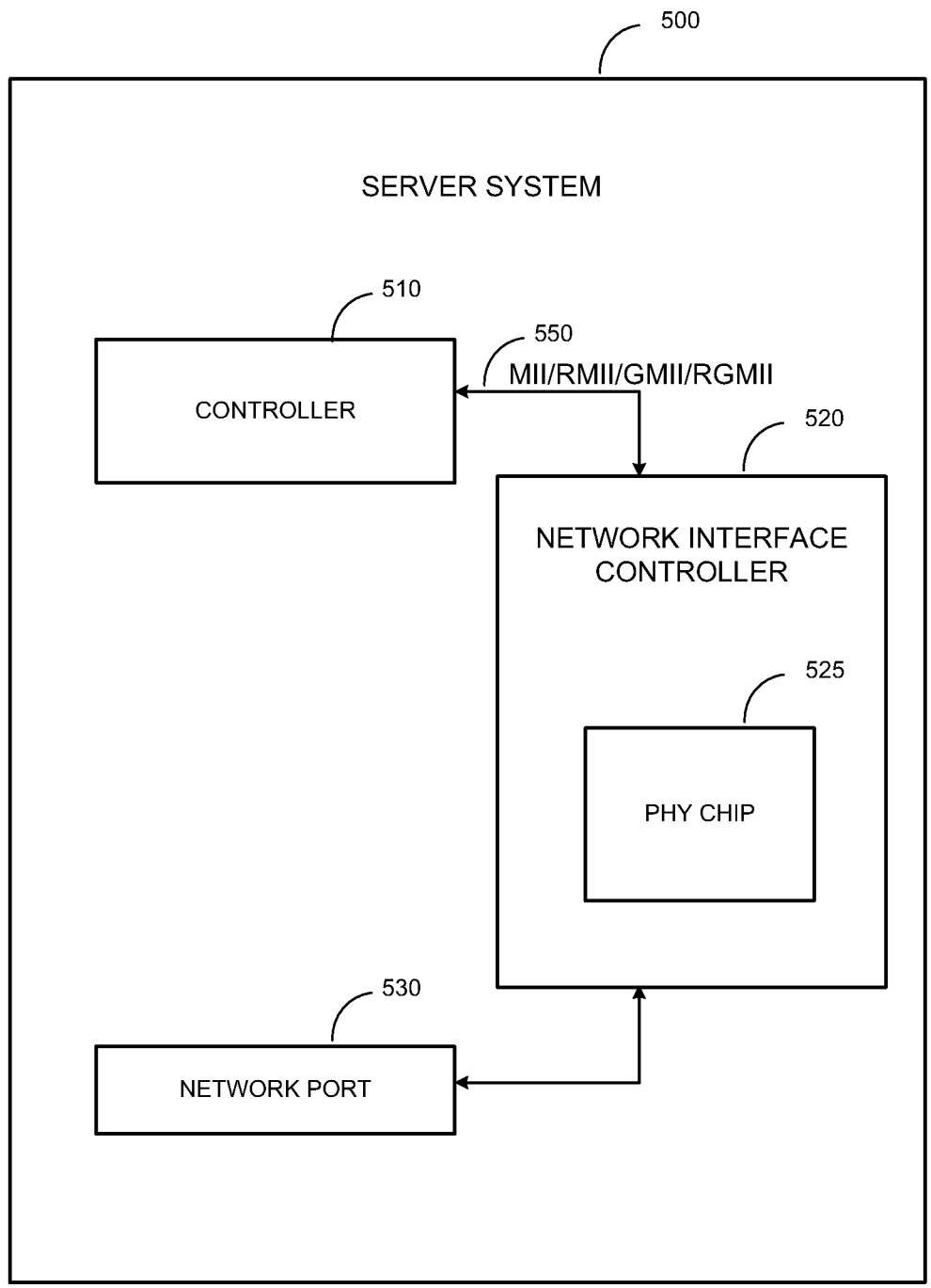
FIG. 5 illustrates a block diagram of an example server system with a dedicated network configuration, according to certain aspects of the subject technology.

FIG. 5 illustrates a block diagram of an example of an example server system 500 with a dedicated network configuration, according to certain aspects of the subject technology. The server system 500 can, for example, be a server system in a data center or a personal computer. The server system 500 can include a controller 510 (e.g., BMC), a NIC 520, and a network port 530. In a related aspect, the server system 500 can include a computing module, which may not need network access when the server system 500 is powered down.

The NIC 520 can include a PHY chip (e.g., PHYceiver in an Ethernet device) 525. The PHY chip 525 can function to connect a media access control (MAC) device to a physical medium such as an optical fiber or copper network cable.

The controller 510 can connect to the NIC 520 via a Media Independent Interface (MII), Reduced Media Independent Interface (RMII), Gigabit Media Independent Interface (GMII), or Reduced Gigabit Media Independent Interface (RGMII). The MII, RMII, GMII, and RGMII interfaces are media independent, which meaning they are compatible with different media (e.g., twisted pair copper, fiber optic, etc.). The NIC 520 can be connected to the network port 530. The network port 530 can be, for example, a LAN port or a RJ45 port. The connection between the NIC 520 and the controller 510 (e.g., MII, RMII, GMII, or RGMII) can function as a dedicated network connection for the controller 510.

If the controller 510 determines not to share network access, such as for example when the controller 510 does not detect a computing module or if the system 500 is shut down, the controller 510 enable the MII/RMII/GMII/RGMII dedicated to the controller 510.

Figure 6:
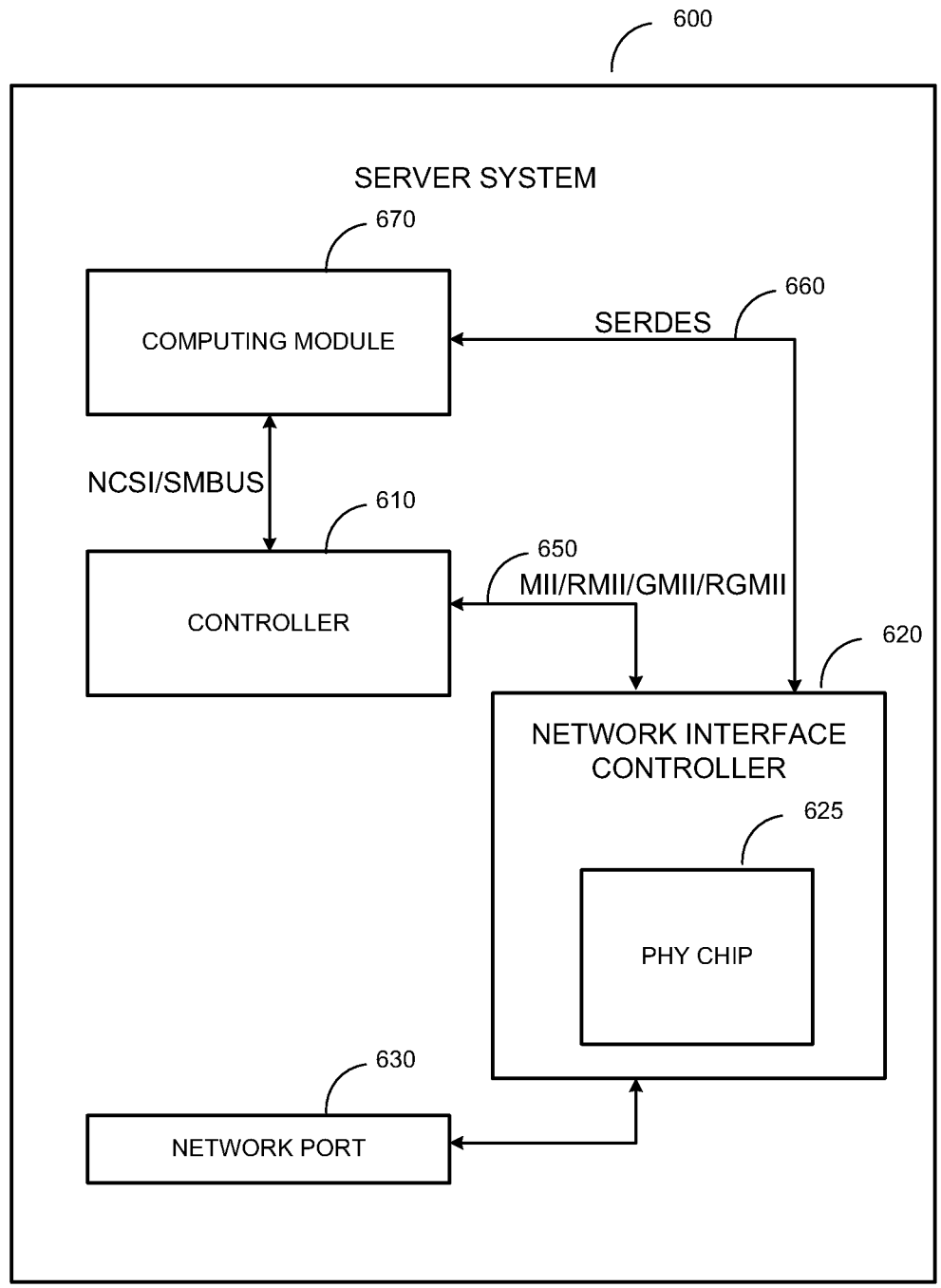
FIG. 6 illustrates a block diagram of example server system for managing network configurations, according to certain aspects of the subject technology.

FIG. 6 illustrates a block diagram of an example server system 600 for managing network configurations, according to certain aspects of the subject technology, according to certain aspects of the subject technology. The server system 600 can, for example, be a server system in a data center or a personal computer. The server system 600 can include a controller 610 (e.g., BMC or RMC), a NIC 620, a network port 630. The server system 600 can additionally include a computing module 670. Because both the computing module 670 and the controller 610 may require network access, they both may need connections to the NIC 620.

The NIC 620 can include a PHY chip (e.g., PHYceiver in an Ethernet device) 625. The PHY chip 625 can function to connect a media access control (MAC) device to a physical medium such as an optical fiber or copper network cable.

The computing module 670 can connect to the controller 610 via a Network Controller Sideband Interface (NCSI) or a SMBus. The computing module 670 can additionally connect to the NIC 620 via a Serializer/Deserializer (SERDES) interface.

The controller 610 can connect to the NIC 620 via a Media Independent Interface (MII), Reduced Media Independent Interface (RMII), Gigabit Media Independent Interface (GMII), or Reduced Gigabit Media Independent Interface (RGMII). The MII, RMII, GMII, and RGMII interfaces are media independent, which meaning they are compatible with different media (e.g., twisted pair copper, fiber optic, etc.). The NIC 620 can be connected to the network port 630. The network port 630 can be, for example, a LAN port or a RJ45 port.

The controller 610 can determine whether to share a network connection, for example, by detecting whether a computing module is present, whether the system 600 is powered down, or whether a dedicated network connection for the controller 610 is disconnected or malfunctioning.

The connection between the NIC 620 and the controller 610 (e.g., MII, RMII, or GMII) can function as a dedicated network connection for the controller 610. The controller 610 can also connect to the NIC 620 through the computing module 670 via, for example, the NCSI/SMBus and the SERDES interface.

If the controller 610 determines not to share network access, such as when the system 600 is powered down, the controller 610 can enable the MII/RMII/GMII dedicated to the controller 610.

If the computing module 670 and the controller 610 both need network access, the controller 610 can enable the NCSI/SMBus and SERDES interface shared by the computing module 670 and the controller 610, and additionally disable the MII/RMII/GMII dedicated to the controller 610. In a related aspect, enabling the SERDES interface can include changing a PHY chip hardware strapping to enable the SERDES interface. In a related aspect, if the MII/RMII/GMII/RGMII dedicated to the controller 610 is disconnected or malfunctioning, the controller 610 can enable the NCSI/SMBus and SERDES interface shared by the computing module 670 and the controller 610, and additionally disable the MII/RMII/GMII dedicated to the controller 610.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method comprising:
   determining, by a controller in a server system, whether to share a network connection of the server system;
   determining to share the network connection;
   enabling a first shared network connection between the controller and a computing module in the server system, and enabling a second shared network connection between the computing module and a network interface controller (NIC) in the server system, wherein the controller is coupled to the NIC via the first shared network connection and the second shared network connection, wherein the computing module is coupled to the NIC via either the second shared network connection, or via the first shared network connection, the controller and a dedicated network connection between the controller and the NIC; and
   disabling the dedicated network connection between the controller and the NIC by changing a PHY chip hardware strapping.

2. The method of claim 1, further comprising enabling the dedicated network connection between the controller and the NIC in the server system, in response to determining to share the network connection.

3. The method of claim 1, wherein determining whether to share a network connection of the server system comprises detecting whether the computing module is present.

4. The method of claim 1, wherein determining whether to share a network connection of the server system is at least in part based on whether the server system is powered down.

5. The method of claim 1, wherein determining whether to share a network connection of the server system is at least in part based on whether the dedicated network connection between the controller and the NIC is disconnected or malfunctioning.

6. The method of claim 1, further comprising:
   detecting for a malfunction in the second shared network connection; and
   in response to detecting the malfunction in the second shared network connection, enabling the dedicated network connection.

7. The method of claim 1, wherein the server system includes only one NIC.

8. The method of claim 1, wherein the second shared network connection comprises a Serializer/Deserializer (SERDES) interface.

9. The method of claim 1, wherein enabling the second shared network connection comprises changing a PHY chip hardware strapping.

10. The method of claim 1, wherein the dedicated network connection comprises a Media Independent Interface (MII), Reduced Media Independent Interface (RMII), Gigabit Media Independent Interface (GMII), or Reduced Gigabit Media Independent Interface (RGMII) between the controller and the NIC.

11. The method of claim 1, wherein the NIC comprises a PHY chip.

12. A server system comprising:
    a network interface controller (NIC);
    a controller configured to:
      determine whether to share a network connection of the server system;
      determine to share the network connection;
      enable a first shared network connection between the controller and a computing module in the server system, and enable a second shared network connection between the computing module and a network interface controller (NIC) in the server system, wherein the controller is coupled to the NIC via the first shared network connection and the second shared network connection, wherein the computing module is coupled to the NIC via either the second shared network connection, or via the first shared network connection, the controller and a dedicated network connection between the controller and the NIC; and
      disable the dedicated network connection between the controller and the NIC by changing a PHY chip hardware strapping.

13. The server system of claim 12, wherein determine whether to share a network connection of the server system comprises detecting whether the computing module is present.

14. The server system of claim 12, wherein determine whether to share a network connection of the server system is at least in part based on whether the server system is powered down.

15. The server system of claim 12, wherein determine whether to share a network connection of the server system is at least in part based on whether the dedicated network connection between the controller and the NIC is disconnected or malfunctioning.

16. The server system of claim 12, wherein the first shared network connection comprises a Network Controller Sideband Interface (NCSI) or a System Management Bus (SMBus).

17. The server system of claim 12, wherein the second shared network connection comprises a Serializer/Deserializer (SERDES) interface.

18. A non-transitory computer-readable medium storing executable instructions which cause a data processing device to:
   determine whether to share a network connection of the server system;
   determine to share the network connection;
   disable a dedicated network connection between the controller and a network interface controller (NIC) in the server system by changing a PHY chip hardware strapping;
   enable a first shared network connection between the controller and a computing module in the server system; and
   enable a second shared network connection between the computing module and the NIC, wherein the controller is coupled to the NIC via the first shared network connection and the second shared network connection, wherein the computing module is coupled to the NIC via either the second shared network connection, or via the first shared network connection, the controller and a dedicated network connection between the controller and the NIC.

19. The server system of claim 12, wherein the controller is further configured to:
   detect for a malfunction in the second shared network connection; and
   in response to detecting the malfunction in the second shared network connection, enable the dedicated network connection.

* * * * *